United States Patent [19]
Mathivat et al.

[11] Patent Number: 5,254,855
[45] Date of Patent: Oct. 19, 1993

[54] DEVICE FOR CONTACTLESS DETECTION OF GLASS SHEETS IN MOVEMENT WITH ISOTHERMAL LIGHT PATH ENVIRONMENT

[75] Inventors: Denis Mathivat, Thourotte; Jacques Sabater, Gif sur Yvette; Frederic Weber, Compiegne, all of France

[73] Assignee: Saint-Gobain Vitrage International, Courbevoie, France

[21] Appl. No.: 811,618

[22] Filed: Dec. 23, 1991

[30] Foreign Application Priority Data

Dec. 21, 1990 [FR] France .................................. 90 16094

[51] Int. Cl.⁵ ............................................. H01V 5/02
[52] U.S. Cl. ..................................... 250/239; 250/216
[58] Field of Search ............... 250/554, 216, 239, 352, 250/353, 223 B; 356/239, 240

[56] References Cited

U.S. PATENT DOCUMENTS

| | | | |
|---|---|---|---|
| 3,216,477 | 11/1965 | Devine | 250/554 |
| 4,163,903 | 8/1979 | Robertson | 250/554 |
| 4,694,158 | 9/1987 | Leser | 250/223 B |

*Primary Examiner*—David C. Nelms
*Attorney, Agent, or Firm*—Oblon, Spivak, McClelland, Maier & Neustadt

[57] ABSTRACT

A device for contactless detection of glass sheets in movement in glass installations, using a reflective photoelectric barrier, includes an emitter and a receiver (3) of light beams (4). The light beams follow a path in a channel (6) of heat-resistant material whose walls delimit a homogeneous isothermal environment, the channel emerging in the vicinity of sheet (11) to be detected.

19 Claims, 2 Drawing Sheets

DEVICE FOR CONTACTLESS DETECTION OF GLASS SHEETS IN MOVEMENT WITH ISOTHERMAL LIGHT PATH ENVIRONMENT

BACKGROUND OF THE INVENTION

Field of the Invention

This invention is directed to a device for contactless detection of glass sheets in movement, with a reflective photoelectric barrier, in installations of the glass industry, and in particular in installations for production of bent and/or tempered glazings, which is operational even in hot zones and/or in disturbed atmosphere.

Description of the Related Art

Actually, in glass installations, it is necessary to be able to identify the passage of each glass sheet at given points. This identification in space and time makes it possible to control the triggering of a subsequent operation or operations for treating the glass sheet, or of an operation for correcting the positioning of the latter.

Now, it happens that the market requires increasingly complex glazing shapes, which involves increasingly improved operations for treating glass sheets. The detection then becomes an essential stage for assuring the good synchronization of these operations. It is therefore necessary to develop ever more reliable, quick, precise detectors, whatever their location in the installation may be, such as, for example, the glory hole, or any other zone of an automatic installation for bending and/or tempering glass sheets, in particular for obtaining automobile glazings.

In this case, the sheets to be detected have a temperature, during their movement into the furnace up to the bending cell, which increases until exceeding their softening temperature, the bending being performed at between 500° and 700° C.

It thus is known to place a detector increasingly far into the production line, in zones with more or less high temperature, and, moreover, having a tendency to be disturbed by slight stirrings of air due to the repeated openings of the doors of said zones among whose number are counted, for example, the glory hole, or the cell for bending or even for tempering.

These openings must, nevertheless, have the equipment for bending and/or tempering circulate from one zone to the other.

This increasingly "slow" detection makes it possible to reduce to a maximum the distance between the location where the sheet is detected and the location where the operation, activated by the detection on said sheet, is triggered. Thus, the uncertainties in the detection are limited, and consequently, in the subsequent operations that it triggers, uncertainties resulting from accidental events which can occur on the sheet between these two locations are limited.

The first detectors proposed were optical detectors whose operation was based on the principle of the emission of a light beam in the transport plane of the glass sheet, a light beam whose cutoff during the passage of said sheet is identified. Thus, any contact between detector and sheet that can cause marking of the latter was avoided when it went beyond its softening point.

But these beams are greatly disturbed when they go through layers of air having slight temperature differences. This is particularly true when the distance to be passed through by the light beams is great. This leads to path deviations of the beams which are more or less refracted, causing a completely erroneous detection.

To eliminate this problem, other detectors have then been used, such as mechanical detectors, an example of which, consisting of a retractable pin integral with a roller conveyor, is described in patent EP-B-0217708. The latter exhibit the advantage of being entirely insensitive to the temperature of the outside environment and of being able to be easily moved over the entire width of the transport plane of the sheet. Actually, the position of the retractable pin along its roller can easily be modified. Now, it is important, precisely, to have an easily movable detector, so as to select the point of detection as a function of each type of glazing, depending on its dimensions and the configuration of the edge that it is desired to detect.

As a rule, marking of the sheet is avoided, because from the first impact between the sheet in movement and the detection pin, the latter tilts. But in this process of detection, a cylinder, jointed on the lever arm integral with the detection roller, operates which can pose problems of reliability, in particular due to a reaction delay time. There therefore exists a risk of possible marking of the sheet with this type of detector, that can compromise the optical quality of the latter if it has already reached its softening temperature.

The pneumatic detectors, such as those described in patent application EP-A 0348266, have the advantage of detection a sheet without contact with the latter. They consist either of an emitter and a receiver of pressurized gas placed on both sides of the transport plane of the sheet, the receiver detecting the cancellation of the pressure due to the passage of the sheet; or of an emitter and receiver both placed under the transport plane, the receiver detecting, this time by reflection, the pressure difference induced by the passage of the sheet. In both cases, to maintain a good precision and a reasonable response time, it is necessary to position the emitter very close to the glass sheet, at a distance on the order of several millimeters. Any chance deviation relative to this quite precise distance causes errors in the detection. To avoid such deviations is nevertheless not easy, for example, in the high temperature zones causing a certain expansion of the equipment. Moreover, the thicknesses of the glass sheets are variable. It is therefore necessary to adjust again, with each new production, the location in the vertical plane of the emitter and the receiver, which is at times quite difficult.

Efforts have also been made to improve the optical detection systems, but this time by guiding the light beams. Patent application EP-A-0267850 specifies guiding these beams by bundles of optical fibers, which are particularly suitable for any installation configuration.

But the use of such glass fibers, however, is problematic in too hot an environment, because the fibers, damaged by the too great heat, have a tendency to break, in the long run, even if an attempt is made to cool them by surrounding them with a sheath in which a cooling fluid circulates. And, in any case, the output of these fibers, even with this protective sheath, is relatively vulnerable to the very great heat.

Such a gradual deterioration of the fibers under the immediate influence of very high temperatures causes a reduction of the intensity of the light beams, to a threshold where the detection loses all reliability.

SUMMARY OF THE INVENTION

This invention therefore has as its object a detection device eliminating all these drawbacks, in particular by offering a precise, quick detection of the presence of a glass sheet in movement, and which is not disturbed in the hot zones whose temperature can exceed the softening temperature of the glass, and/or in the zones with stirring of air.

The device according to the invention makes it possible to detect without contact, glass sheets in movement in glass installations by using a reflective photoelectric barrier comprising an emitter and a receiver of light beams, said beams following a path in a channel of heat-resistant material, whose walls delimit a homogeneous isothermal environment, this channel emerging in the vicinity of the sheet to be detected.

By channel is meant a waveguide, which exhibits the feature, according to the invention, of having a large-sized section, without a dimension common with those of the optical fibers, a section, for example, on the order of several square centimeters.

By selecting an optical detection, any danger of marking is eliminated. Moreover, by choosing to have the light beams follow a path in a channel, the risks of diffraction and/or deviation that free light beams incur in disturbed zones are also eliminated, as has already been explained. Moreover, the selection of a channel of heat-resistant material will make it possible to use it in high-temperature zones which damage waveguides such as optical fibers.

Said channel preferably consists of a metal pipe.

Advantageously, it is possible to choose to obtain a path of the emitted beam leaving the channel which is approximately perpendicular to the transport plane of the sheet to be detected. Actually, when it is desired to detect an edge of a sheet in movement, the detection will be more precise if the beam is reflected virtually perpendicular to said edge.

Various variants of the device can be proposed. If, for example, it is a matter of a detection while the transport plane of the sheets is vertical, the light beam can enter by a section of the pipe and come out through the other. But if the transport plane is, for example, horizontal and it is not possible to place the pipe easily so that the beam leaving the pipe by a section can go through this transport plane, it is necessary to consider providing it with optical parts resistant to high temperature, which will make it possible to have the light beams at best follow a path, and mainly to focus them in the zone of passage of the glass sheets.

Said optical parts can be further treated with a non-glare coating.

Thus, a lateral output can be drilled in the wall of the pipe and a heat-resistant prism can be placed in the pipe, bending the path of the emitted light beam toward the lateral output. Therefore, it is possible to adapt the device according to the invention to any installation configuration: actually, regardless of the inclination of the longitudinal axis of the pipe relative to the transport plane of the sheet, the prism is positioned to have the desired output path. It should be noted that it is possible to position the prism to obtain a better selectivity of the light beams reaching the receiver.

Actually, it is desirable to incline the prism so that the perpendicular to the first face encountered by the light beam emitted from the prism is not completely parallel to said beam, the angle of inclination being in general less than 10°, as a function of the characteristics of the optical parts. Thus, it is avoided that the receiver receives stray light beams coming from the reflection of the light beam emitted on the faces of the prism.

The precision of the detection is all the better the more precisely the light beam is focussed on the glass sheet, creating a light "spot" all the more localized and faster to analyze the smaller it is. For this focussing, it is possible to provide, opposite the output, a first lens: the latter makes possible an optimal focussing of the emitted beam leaving the pipe on the sheet to be detected.

It is also possible, for example, to place a second lens in the input section of the emitted beam, to channel the path of the beam parallel to the walls of the pipe.

It is specified that it is advantageous to have a small-sized, almost pinpoint light source, so as to have to focus the smallest light beam possible. Thus, the precision will be optimal. For this purpose, it is possible to use an emitting diode as an emitter.

The light beams emitted and received are advantageously centered on a well-selected wavelength, which can be selected in the entire range that can go from ultraviolet to infrared. It is possible to select, for example, a wavelength of the infrared range provided that it is well known how to process signals in this range and that powerful emitters exist in this same infrared range. Moreover, the emitter emits the light beam by amplitude modulation. The receiver is capable of identifying, on return, the reflected light ray thanks to its particular wavelength and to filter it by putting aside all other unwanted infrared radiations, which increase in heated chambers like a glory hole. The modulation makes it possible to eliminate the continuous component of parasitic radiation of the same wavelength.

Advantageously, it is possible to place near the output of the channel a protective part such as a cone, whose widest section is applied to said opening. It makes it possible to guard the optical parts against possible falling dust or cullet.

It is possible, for example, to place the channel in a plane parallel to the transport plane of glass sheets to be detected: this can prove practical, in a glory hole of a bending/tempering installation, where the plane parallel to the roller conveyors and particularly below the latter is an accessible and not very cluttered zone; it is consequently sufficient to adjust the prism.

The channel comes out, for example in this case, at a distance between 50 and 80 mm from the transport plane of the glass sheet to be detected. A very significant advantage becomes apparent here: it is possible to place this channel at a fairly great distance from the sheet, without affecting the precision of the detection. Further, since it is relatively far from the rollers, there is no danger of holding back possible bits of broken glass, jammed between roller and device.

The channel is thus placed under the rollers, and not between them, the channel is then much more accessible. This position of the channel makes it possible to move it very easily to the location where it is desired to perform the detection, all along the path of the roller conveyors. As indicated above, the maximum precision is obtained when the beam is perfectly focussed on the glazing; however, the detection device according to the invention is perfectly effective even if said distance undergoes deviations, in the range indicated above, from 10 to 15 mm. There is therefore no need to make complex and repetitive adjustments to determine the good position in height of the detector. Moreover, the fact that the channel is clearly below the rollers avoids an accumulation of undesirable cullet between the rollers and the channel. The possible cullet can flow out here without any problem on both sides of the channel.

It is possible to choose to emit the light beams from the emitter and the receiver to the input of the channel and/or inside the latter, at the very least over a certain length of this channel by optical fibers. The latter are actually a waveguide that is particularly practical in use and very suitable if they are not exposed to too great heats.

BRIEF DESCRIPTION OF THE DRAWINGS

The details and advantageous characteristics of the invention are now described with reference to the accompanying drawings in which.

DETAILED DESCRIPTION OF THE PREFERRED EMBODIMENTS

In the two figures, for the sake of clarity, the relative proportions of the various diagrammed elements have not been observed.

Figure 1:
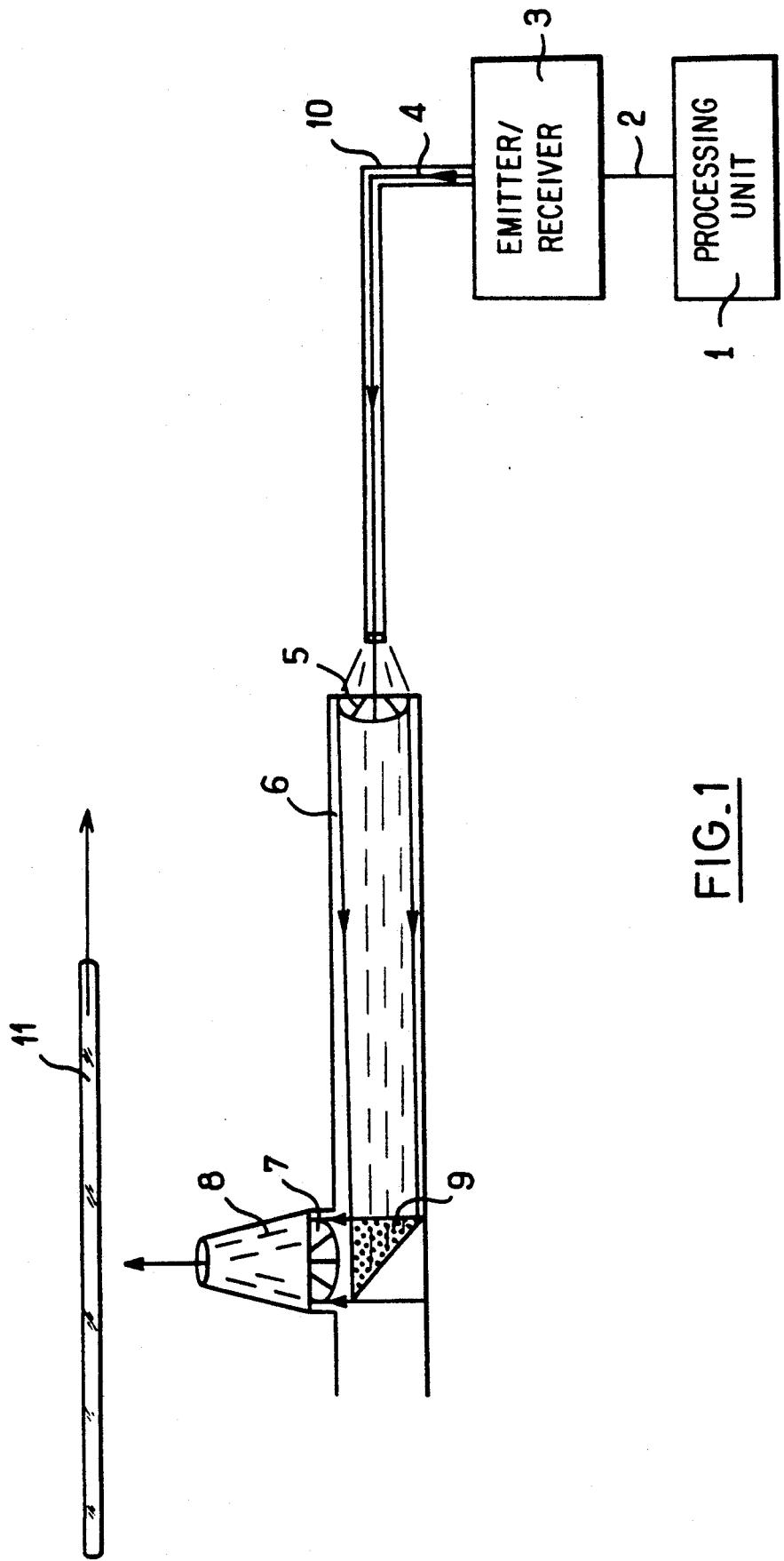
FIG. 1 is a diagram of an embodiment of the detection device according to the invention.

In FIG. 1, the detection device has therefore been represented according to a nonlimiting embodiment of the invention. In a known manner, an emitter/receiver 3 of light beams is placed sheltered from any heat source. The emitter can be an emitting diode, an almost pinpoint light source. Emitted beams 4 are centered on a selected frequency and modulated in amplitude. In this example, a frequency in the infrared range has been considered.

In a known manner, the receiver translates the received light beams into electric pulses, subsequently processed and used by a processing unit 1 connected electrically 2 to the receiver.

The emitted beam follows a path from emitter/receiver 3 to the vicinity of a sheet 11 to be detected, going through an elongate channel 6. It enters by a section of the channel and can go out either by the other section or by a lateral output. In this example, a lateral output has been selected. The reflected beam follows the same path in reverse direction.

Still according to this example, the path goes partly through a sheltered zone that is not hot, which extends from an emitter/receiver 3, and partly through a disturbed and/or very hot zone, such as a furnace, for example, where sheet 11, whose presence and/or position it is desired to be detected, is found.

Outside the hot and/or disturbed zone, the beams can be guided from emitter/receiver 3 by any known means, such as, for example, here, by optical fibers 10, which constitute a particularly effective waveguide when they are not exposed to high temperatures. Here, very advantageously, the output face of the optical fibers will act as an almost pinpoint light source. It should be noted that the latter can have a variable length according to the configuration of the installation and according to the positions of emitter/receiver 3 and processing unit 1. It is even possible not to use such a guide 10, but this then leads to bringing emitter/receiver 3 near the hot zone, which can pose problems of protecting the latter relative to the radiated heat and/or problems of bulkiness in a handling zone. Or then, it is necessary to organize very precise and immutable paths for the free light beams, which is perhaps not very practical if it is desired later to modify the installation configurations.

As soon as the beams penetrate the hot and/or disturbed zone, the device designed according to the invention makes it possible to provide the latter with a path in an isothermal and homogeneous environment, sheltered from movements of hot air close to the sheet. This result is obtained by channel 6, whose walls delimit such an environment. Nevertheless, it is obvious that such a channel can, a fortiori, guide the beams during their path in a sheltered and/or not hot zone.

According to the embodiment represented, channel 6 consists of a metal pipe with a 5 cm×5 cm square section, of variable length depending on the configuration of the installation and depending on the point of passage where it is desired to detect sheet 11.

This length can increase to correspond to the width of the installation, it then is necessary to make certain that the pipe does not have a tendency to bend when it is subjected to high temperature if it is relatively long.

This channel is equipped with three optical parts, preferably of silica, a material which is resistant at a temperature greater than 1000° C.: First of all, a first lens 5 is placed at the end of the pipe where emitted light flux enters and is intended to channel the latter into said pipe. A prism 9 is positioned in the outlet of the pipe, determining the end of the path parallel to the plane of the pipe of the emitted beam. The beam, by striking the prism, is reflected and leaves again in a selected direction, here almost perpendicular to the axis of the pipe in the diagrammed embodiment. The third part is a lens 7 at the outlet to refocus the beam reflected by the prism. It is placed on the lateral output for said beam arranged in the wall of the tube. To give numbered particulars relative to FIG. 1, it is possible, for example, to use input and output lenses of 75 mm focal distance, of 40 mm diameter and of plane convex type. The channel can have a length of 1.80 m, and the diameter of the optical fibers can be 1 to 2 mm. It then is advantageous, by considering this data, to incline the prism along a given axis with a value of about 1/5 of a degree: it is sufficient to prevent the receiver from picking up unwanted rays reflected on the faces of the prism.

In this example, a part of the outlet intended to protect the optical parts from falling cullet has been added. It involves a cone 8, preferably metal, whose largest diameter is adjusted based on the output of the emitted beam.

It further is possible to equip channel 6 with a gas intake such as a very fine pipe, not represented in FIG. 1, which enters the channel, for example, at the input section of the emitted beam, and which comes out both close to prism 9 and close to lens 7 while still inside the channel. This pipe, fed by gas, then makes it possible, by blowing very gently on each of these optical parts, to rid them of possible traces of dust and/or scale.

Figure 2:
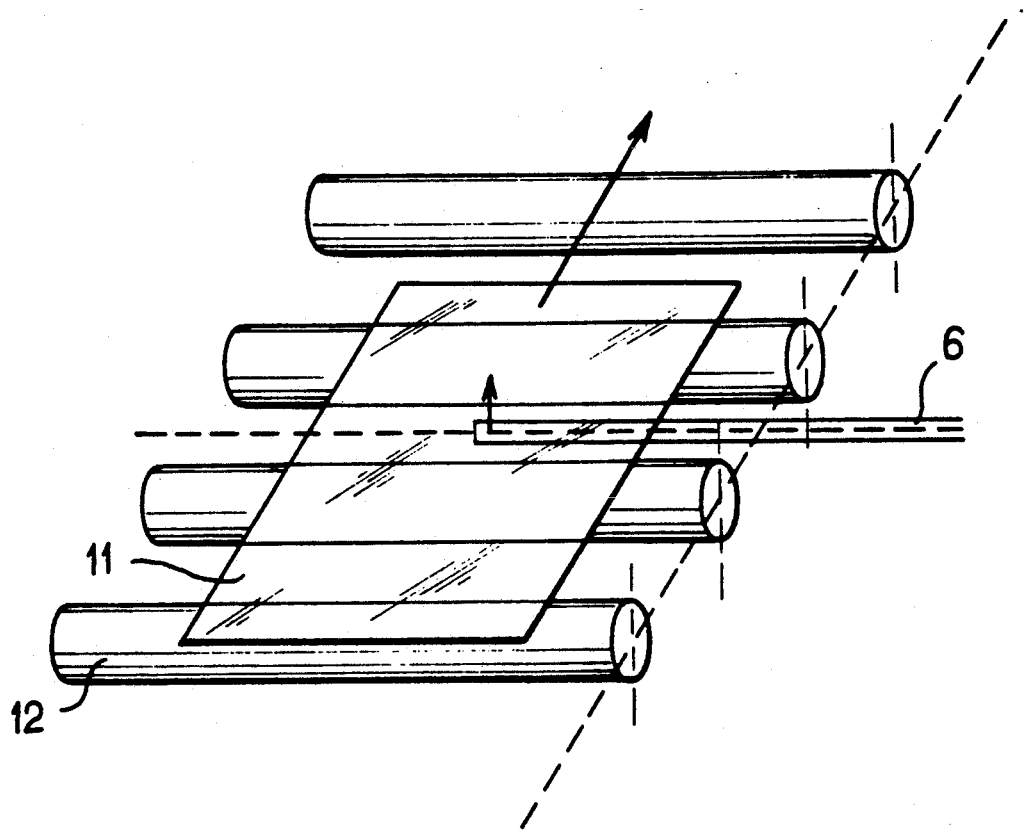
FIG. 2 is a diagram of the channel belonging to said device, in place under the roller conveyors of a glory hole of an installation for bending and/or tempering glass sheets.

According to FIG. 2, the possible position of the channel in a section of a glory hole of a bending and/or tempering installation is indicated. It is obvious that this arrangement is given only by way of example, and that the position of the channel according to the invention can be considered at any usual location of detection of glass sheets of a glass installation.

This diagram, for simplification, indicates only the roller conveyors of the furnace. Channel 6 is advantageously under these rollers, parallel to one of them, one of its ends being outside the furnace. Thus, it is accessible for adjustments. The emitted beam, going out perpendicularly to the pipe, also strikes perpendicularly the moving sheet 11.

The free path of the emitted beam leaving said channel before encountering the glass sheet is 65 mm here, but can vary between 50 and 80 mm. Even if deviations of 10 to 15 mm occur in this range of length, the latter do not cause significant problems in the detection such as an inaccuracy or an increase of response time.

Therefore, it is found that such a channel is very suitable: according to the diagram, it can be seen that it is possible to move it easily over the entire width of the rollers as well as to move it close to this or that roller over the entire length of the set of rollers.

The detection by such a device is extremely fast and precise.

We claim:

1. Device for contactless detection of glass sheets in movement in high temperature glass installations, comprising:
   a reflective photoelectric barrier comprising an emitter and a receiver of light beams, and
   an elongate channel of heat-resistant material whose walls delimit a homogeneous isothermal environment in a high temperature region of the installation, said channel being positioned in the path of light beams from said emitter and having a light beam outlet means for causing the light beam to emerge in the vicinity of a transport plane of a glass sheet to be detected.

2. Device according to claim 1, wherein said channel comprises a closed, hollow metal pipe extending from the high temperature region to a region outside of the high temperature region.

3. Device according to claim 1, wherein said outlet means includes optical parts to focus the light beam.

4. Device according to claim 3, wherein said outlet means includes a heat-resistant lens.

5. Device according to claim 4, wherein the channel comprises internal reflective deflecting means.

6. Device according to claim 4, wherein said light beam output means is lateral to the axis of the channel and wherein the channel comprises a heat-resistant prism bending the path of the light beam to said lateral output means.

7. Device according to claim 1, wherein said channel is placed in a plane parallel to the transport plane of the glass sheet to be detected.

8. Device according to claim 1 including glass sheet transport means, wherein said channel is placed under the transport means.

9. Device according to claim 6 including a heat-resistant lens positioned where the light beam from the emitter enters the channel.

10. Device according to claim 6 including an anti-cullet protection part on said outlet means.

11. Device according to claim 3 including a gas intake in said channel.

12. Device according to claim 1, wherein the emitter is an emitting diode.

13. Device according to claim 1, wherein the emitted light beam is centered on a particular wavelength.

14. Device according to claim 13, wherein the selected wavelength belongs to the infrared range.

15. Device according to claim 1, wherein the emitted light beam is modulated in amplitude.

16. Device according to claim 1, wherein said channel terminates at a distance of between 50 and 80 mm from the transport plane of the glass sheet.

17. Device according to claim 9, wherein the surfaces of said heat-resistant lenses and said heat-resistant prism are nonglare treated.

18. Device according to claim 6, wherein said prism is placed so that an angle between the emitted light beam and a perpendicular to a first face of said prism encountered by said beam is less than 10 degrees.

19. Device according to claim 1 including at least one optical fiber positioned between said emitter and said channel for guiding light beams.

* * * * *